United States Patent
Akasaka et al.

(10) Patent No.: US 9,193,836 B2
(45) Date of Patent: Nov. 24, 2015

(54) PROCESS FOR PRODUCTION OF POLYAMIDEIMIDE RESIN MICROPARTICLES, AND POLYAMIDEIMIDE RESIN MICROPARTICLES

(75) Inventors: Hiroaki Akasaka, Nagoya (JP); Takae Ono, Nagoya (JP); Toshiya Takahashi, Nagoya (JP)

(73) Assignee: Toray Industries, Inc. (JP)

( * ) Notice: Subject to any disclaimer, the term of this patent is extended or adjusted under 35 U.S.C. 154(b) by 476 days.

(21) Appl. No.: 13/508,200

(22) PCT Filed: Oct. 6, 2010

(86) PCT No.: PCT/JP2010/067514
§ 371 (c)(1),
(2), (4) Date: May 31, 2012

(87) PCT Pub. No.: WO2011/062006
PCT Pub. Date: May 26, 2011

(65) Prior Publication Data
US 2012/0237771 A1  Sep. 20, 2012

(30) Foreign Application Priority Data
Nov. 19, 2009  (JP) .................. 2009-264007

(51) Int. Cl.
 *C08G 73/14* (2006.01)
 *C08J 3/14* (2006.01)
(52) U.S. Cl.
 CPC . *C08J 3/14* (2013.01); *C08G 73/14* (2013.01); *C08J 2379/08* (2013.01); *Y10T 428/2982* (2015.01)
(58) Field of Classification Search
 None
 See application file for complete search history.

(56) References Cited

U.S. PATENT DOCUMENTS

| 3,661,832 A | 5/1972 | Stephens et al. | |
| 2005/0163860 A1* | 7/2005 | Albrecht et al. | ............. 424/501 |
| 2006/0293425 A1* | 12/2006 | Nakanishi et al. | ............. 524/403 |

FOREIGN PATENT DOCUMENTS

| JP | SHO-42-15637 | 1/1963 |
| JP | SHO-49-4077 B | 1/1974 |
| JP | SHO-50-33120 B | 10/1975 |
| JP | 56-59845 | 5/1981 |
| JP | 61-234 | 1/1986 |
| JP | 04-285660 | 9/1992 |
| JP | 11-246759 | 9/1999 |
| JP | 2000-17073 | 1/2000 |
| JP | 2003-252990 | 9/2003 |
| JP | 2002-82696 | 3/2005 |
| JP | 2005-97370 | 4/2005 |
| JP | 2006-257345 | 9/2006 |
| JP | 2009-067880 | 4/2009 |

OTHER PUBLICATIONS

Machine translation of JP 2003-252990.*

* cited by examiner

*Primary Examiner* — Ana Woodward
(74) *Attorney, Agent, or Firm* — DLA Piper LLP (US)

(57) ABSTRACT

A process for producing fine particles of polyamide-imide resin includes a dissolution step and a precipitation step wherein the dissolution step is selected from steps (a1) and (b1); (a1) polyamide-imide resin is dissolved in an organic solvent to prepare a polyamide-imide resin solution A1 having a polyamide-imide resin content of less than 5 mass %; and (b1) polyamide-imide resin is dissolved in an organic solvent to prepare a polyamide-imide resin solution B1 having a polyamide-imide resin content of less than 10 mass %, and the precipitation step is selected from (a2) the polyamide-imide resin solution A1 is added to a solvent that is virtually free from surface active agents and able to precipitate fine particles of the polyamide-imide resin to cause precipitation of fine particles of the polyamide-imide resin, and (b2) the polyamide-imide resin solution B1 is subjected to flash crystallization to cause precipitation of fine particles of the polyamide-imide resin.

7 Claims, 3 Drawing Sheets

PROCESS FOR PRODUCTION OF POLYAMIDEIMIDE RESIN MICROPARTICLES, AND POLYAMIDEIMIDE RESIN MICROPARTICLES

RELATED APPLICATIONS

This is a §371 of International Application No. PCT/JP2010/067514, with an international filing date of Oct. 6, 2010, which is based on Japanese Patent Application No. 2009-264007, filed Nov. 19, 2009, the subject matter of which is incorporated by reference.

TECHNICAL FIELD

This disclosure relates to a production process for fine particles of polyamide-imide resin and also relates to fine particles of polyamide-imide resin.

BACKGROUND

Polyamide-imide resin is high in heat resistance, chemical resistance, wear resistant, etc., and has been used in producing industrial machine parts, films, electric/electronic parts, automobile parts, and aerospace related components. When polyamide-imide is used for a coating, it is commonly dissolved in an organic solvent and applied as varnish. In recent years, however, reduction in volatility organic compounds (VOCs) has become an important issue and there is a strong call to minimize VOC consumption. A solution is to use polyamide-imide in the form of fine powder. Fine powder can be directly sprayed on a component, or coating can be conducted by preparing an aqueous dispersion and spreading it on a component followed by removing water. Furthermore, fine particles of polyamide-imide resin may be added to other resins or composite materials to develop thixotropy or enhance impact resistance, or may be mixed with other resins to provide materials for shims of disk brakes or the like.

In this way, fine particles of polyamide-imide resin have been used in many application fields and expected to find many new uses in the future. However, they should be dispersed uniformly in water or resin if good properties of polyamide-imide resin are to be drawn on by mixing it with water or resin. To this end, it is preferable that these fine particles have an average primary particle diameter of 300 nm or less, and it is particularly preferable that they have a uniform diameter of 200 nm or less.

A known method to synthesize fine particles of polyamide-imide resin is subjecting a first solution containing an acid chloride such as trimellitic anhydride chloride and a second solution containing a diamine compound such as 4,4'-diaminodiphenyl ether to ultrasonic agitation in the presence of a solvent soluble in both the first and second solutions to produce fine particles of polyamide-imide resin (Japanese Patent No. 4304434, and Japanese Unexamined Patent Publication (Kokai) Nos. 2005-97370 and 2006-257345). This method, however, requires a special apparatus to generate ultrasonic waves and has many disadvantages in producing fine polyamide-imide particles industrially. These publications, furthermore, only address, as a specific example, production of fine polyamide particles from dicarboxylic acid chloride, used as acid chloride, and disclose no examples of producing fine particles of polyamide-imide resin.

Elsewhere, a method for producing fine particles of polyamide-imide resin by spray drying has been disclosed in Japanese Unexamined Patent Publication (Kokai) No. HEI-4-285660. In that method, polyamide-imide resin dissolved in N-methyl-2-pyrrolidinone is spray-dried using a Mobile Minor type spray drier to produce fine polyamide-imide particles with an average particle diameter of 4.5 µm. Some studies have disclosed methods for producing, for instance, fine particles of polyamide-imide resin with an average particle diameter of 3 µm through polymerization of 4,4'-diphenylmethane diisocyanate and trimellitic anhydride (Japanese Unexamined Patent Publication (Kokai) Nos. HEI-11-246759 and 2000-17073). It is impossible for these methods, however, to produce fine particles of polyamide-imide resin of 1 µm or less.

In another disclosed method, polyamide-imide resin dissolved in 1,3-dimethyl-2-imidazolidinone is added to an aqueous solution of a surface active agent having a phenyl group, followed by precipitating fine particles of the polyamide-imide resin (Japanese Unexamined Patent Publication (Kokai) No. 2009-067880). Although able to produce fine particles of polyamide-imide resin of 1 µM or less, this method is low in reproducibility because the particle diameter varies largely depending on the concentration of the surface active agent, the rotating speed of the stirrer, and the time elapsing before the start of dripping of the solution of polyamide-imide resin into the aqueous solution of a surface active agent. As a result, it is not always possible to obtain fine particles of polyamide-imide resin of 1 µm or less. In addition, that method is limited to 1,3-dimethyl-2-imidazolidinone as the solvent to dissolve the PAI resin and requires high speed stirring at 1,000 to 4,000 rpm, leading to various problems in developing industrial production processes.

Under such circumstances, there is now a strong call for development of a process that can perform mass production with a high reproducibility of highly uniform fine particles of polyamide-imide resin with an average primary particle diameter of 300 nm or less, preferably 200 nm or less.

Thus, it could be helpful to provide a process to produce fine particles of polyamide-imide resin (hereinafter, "polyamide-imide" may be abbreviated as PAI) that can be carried out industrially by simple operations.

SUMMARY

We have found that, surprisingly, fine PAI resin particles were produced stably when a solution prepared by dissolving PAI resin in an organic solvent to a concentration of less than 5 mass % was added to a solvent that was virtually free from surface active agents and able to precipitate fine PAI resin particles. We also found that when flash crystallization was performed from an organic solvent, fine PAI particles were produced stably when the content of the PAI resin in the solution was less than 10 mass %.

Specifically, we provide a production process for fine particles of polyamide-imide resin comprising a dissolution step and a precipitation step as described below.

Dissolution Step

A step selected from the below-mentioned steps (a1) and (b1).

(a1) Polyamide-imide resin is dissolved in an organic solvent to prepare a polyamide-imide resin solution A1 having a polyamide-imide resin content of less than 5 mass %.

(b1) Polyamide-imide resin is dissolved in an organic solvent to prepare a polyamide-imide resin solution B1 having a polyamide-imide resin content of less than 10 mass %.

Precipitation Step (a2) The polyamide-imide resin solution A1 is added to a solvent that is virtually free from surface active agents and able to precipitate fine particles of polyamide-imide resin to cause precipitation of fine particles of the polyamide-imide resin.

(b2) The polyamide-imide resin solution B1 is subjected to flash crystallization to cause precipitation of fine particles of the polyamide-imide resin.

Our process can use a solvent other than 1,3-dimethyl-2-imidazolidinone as the solvent to dissolve PAI resin, enabling a higher degree of freedom in industrial production.

Furthermore, we also provide for simple, stable production of fine PAI resin particles with an average primary particle diameter of 300 nm or less, particularly 200 nm or less, thus making industrially useful materials widely available stably.

DETAILED DESCRIPTION

Figure 1:
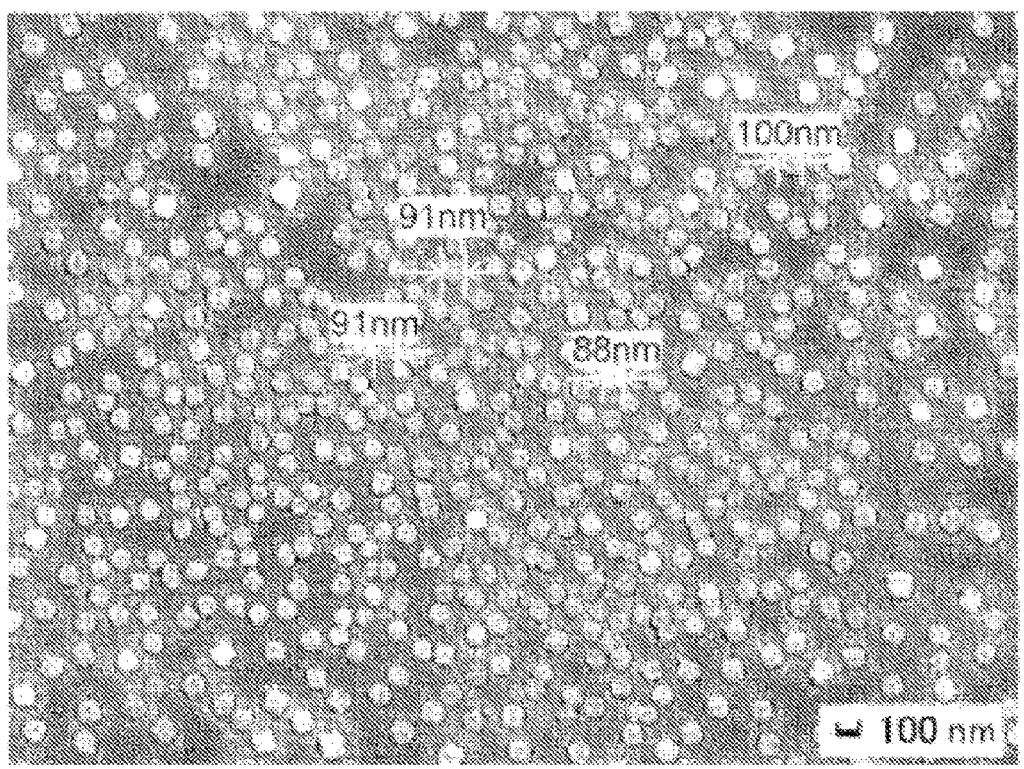
FIG. 1 is a scanning electronic microscope photograph of the fine PAI particles produced in Example 1.

An example of our process is described in detail below.

PAI Resin to be Used as Raw Material

A polyamide-imide resin is produced by polymerizing an acid component such as trimellitic anhydride and trimellitic anhydride monochloride with an amine component.

The known PAI resin production methods include the isocyanate method which uses trimellitic anhydride and diisocyanate as raw materials (for instance, Japanese Examined Patent Publication (Kokoku) No. SHO-50-33120), the acid chloride method which polymerizes trimellitic anhydride chloride and a diamine in N,N-dimethyl acetamide (for instance, Japanese Examined Patent Publication (Kokoku) No. SHO-42-15637), and the direct polymerization method which reacts an aromatic tricarboxylic acid, its anhydride, or its ester with a diamine in a solution in the presence of a trivalent or pentavalent inorganic or organic phosphorus compound (for instance, Japanese Examined Patent Publication (Kokoku) No. SHO-49-4077), all of which may serve to produce a PAI resin useful for our process.

An appropriate polyamide-imide resin may be selected from commercial products, such as TI-5013P, a polyamide-imide resin product supplied by Toray Industries, Inc., and Torlon supplied by Solvay Advanced Polymers, L.L.C.

Production of Fine PAI Resin Particles

The fine PAI resin particles can be produced from the PAI resin through steps including a dissolution step and a precipitate step as described below.

Dissolution Step

A step selected from the undermentioned steps (a1) and (b1).

(a1) Polyamide-imide resin is dissolved in an organic solvent to prepare a polyamide-imide resin solution A1 having a polyamide-imide resin content of less than 5 mass %.

(b1) Polyamide-imide resin is dissolved in an organic solvent to prepare a polyamide-imide resin solution B1 having a polyamide-imide resin content of less than 10 mass %.

Precipitation Step (a2) The polyamide-imide resin solution A1 is added to a solvent that is virtually free from surface active agents and able to precipitate fine particles of polyamide-imide resin, to cause the precipitation of fine particles of the polyamide-imide resin.

(b2) The polyamide-imide resin solution B1 is subjected to flash crystallization to cause the precipitation of fine particles of the polyamide-imide resin.

Specifically, if the dissolution step (a1) is selected above, it should be followed by the precipitation step (a2), whereas if the dissolution step (b1) is selected, it should be followed by the precipitation step (b2). If the PAI resin content is less than 5 mass % as in the step (a1), fine particles can be produced simply by adding the PAI resin to a poor solvent as in the step (a2), but if it is 5 mass % or more, the addition will result in bulky particles or bulky material. The flash crystallization method, or the step (b2), on the other hand, can produce fine particles if the PAI resin content is less than 10 mass %.

Dissolution Step

An appropriate dissolution step is selected from steps (a1) and (a2).

First, the method to be used for dissolution of a polyamide-imide resin in an organic solvent is described below.

A PAI resin is dissolved in an organic solvent in the dissolution step. There are no specific limitations on the shape of the PAI resin and, specifically, it may be in the form of powder, granules, pellets, film, molding or the like. From the viewpoint of increasing operability and shortening the dissolution time, it is preferable that the PAI resin is in the form of powder, granules, or pellets, of which powder is particularly preferable. Here, if it is intended to provide fine PAI resin particles to be used for preparing, for instance, a water-soluble paint, it is particularly preferable that the PAI resin is in the form of powder, granules, or pellets that are free from inorganic ions to prevent the equipment from being corroded by coexisting inorganic ions.

Any organic solvent may be used for this step if it can dissolve the PAI resin. Specifically, the solvent may be at least one selected from the group of N-alkyl pyrrolidones such as N-methyl-2-pyrrolidinone (hereinafter, abbreviated as NMP); N-alkyl caprolactams such as N-methyl-ε-caprolactam; ureas such as 1,3-dimethyl-2-imidazolidinone (hereinafter, abbreviated as DMI); linear amide based solvents such as N,N-dimethyl acetamide (hereinafter, abbreviated as DMAc) and N,N-dimethyl formamide (hereinafter, abbreviated as DMF); and sulfur oxide based polar solvents such as dimethyl sulfoxide (hereinafter, abbreviated as DMSO), dimethyl sulfone, and tetramethylene sulfone.

Whereas the fine PAI resin particle production method described in Japanese Unexamined Patent Publication (Kokai) No. 2009-067880 has problems such as being limit to DMI as solvent and being low in reproducibility, our production method can use the various solvents including DMI as long as the PAI resin content is controlled below the specified content, making it possible to adopt a solvent that meets particular requirements.

The atmosphere in the tank used for the dissolution step may be air, inert gas, or solvent vapor, but it is preferable that the oxygen gas content is low to depress decomposition and degradation of the PAI resin and furthermore to ensure safety of operations. The useful inert gases include nitrogen gas, carbon dioxide gas, helium gas, and argon gas, of which nitrogen gas, argon gas, and carbon dioxide gas are preferable, and nitrogen gas and argon gas are particular preferable, in terms of economic efficiency and availability. On the other hand, the methods for forming a solvent vapor atmosphere include: (1) removing air from the reaction tank by reducing the pressure or drawing a vacuum, followed by heating the reaction tank, (2) heating the reaction tank while aspirating the air, followed by stopping the aspiration when the tank becomes full of the solvent vapor, (3) aspirating the air from the reaction tank, followed by stopping the aspiration when the tank becomes full of the solvent vapor, and (4) aspirating the air from the reaction tank while supplying vapor of the same substance as the solvent to the reaction tank, which may be performed singly or in combination to form an atmosphere of vaporized solvent in the dissolution tank. When any of the methods (2) to (4) is adopted, it is desirable that the quantity of the solvent in the dissolution tank is kept clear.

There are no specific limitations on the dissolution method to be used, but commonly, a PAI resin and a solvent are put in an appropriate container and dissolved by stirring. If it is not dissolved at room temperature, it may be heated to achieve dissolution. To produce fine PAI resin particles with a uniform particle diameter, it is preferable that the PAI resin is completely dissolved in the solvent before addition or flash crystallization for precipitation, but it may be acceptable if part of the PAI resin remain undissolved.

The required dissolution temperature varies depending on the type of solvent used and the content of the PAI resin, but commonly, it is in the range of room temperature to 250° C., preferably room temperature to 100° C.

The required dissolution time varies depending on the type of the solvent used and the initial content and dissolution temperature of the PAI resin, but commonly, it is in the range of 5 minutes to 5 hours, preferably, 10 minutes to 4 hours.

The PAI resin is dissolved by those operations.

The step (a1) is intended for a PAI resin solution A1 having a PAI resin content of less than 5 mass % (which hereinafter may be referred to solution A1).

The viscosity of the PAI resin in the organic solvent rapidly increases with an increasing PAI resin content. In the case of NMP, for instance, the viscosity of the solution is 11 mPa·s at a PAI resin content of 5 mass %, 54 mPa·s at 10 mass %, 225 mPa·s at 15 mass %, and 837 mPa·s at 20 mass % (as measure by the viscosity measuring method described later).

If the viscosity of the solution is too high, fusion bonding of fine particles will take place in the course of precipitation of fine particles, failing to provide fine particles with a small particle diameter or fine particles with a uniform particle diameter, during the precipitation step (a2) described later in which the PAI resin solution is added to a solvent used to precipitate fine PAI resin particles.

Accordingly, in the case where a PAI resin solution is added to a solvent that is free from surface active agents and able to precipitate the PAI resin, the usage of the PAI resin should be such that the PAI resin commonly accounts for less than 5 parts by mass, preferably 0.1 parts by mass or more and less than 5 parts by mass, and more preferably 0.5 to 4 parts by mass, relative to the total quantity of the organic solvent and the PAI resin, which accounts for 100 parts by mass.

The step (b1), on the other hand, is intended for a PAI resin solution B1 having a PAI resin content of less than 10 mass % (which hereinafter may be referred to solution B1).

Specifically, in the case where flash crystallization is performed to produce fine PAI resin particles as in the precipitation step (b2) described later, fine PAI particles can be produced stably if the PAI resin content is less than 10 mass %. Thus, the usage of the PAI resin in solution B1 used in the step (b1) should be such that the PAI resin accounts for less than 10 parts by mass, preferably 0.1 parts by mass or more and less than 10 parts by mass, and more preferably 0.5 parts by mass or more and 7 parts by mass or less, relative to the total quantity of the PAI resin and the organic solvent, which accounts for 100 parts by mass.

The process can be applied to industrial production if the content is in those ranges. A PAI resin is added to the solvent and dissolved at room or elevated temperature, and the resulting PAI resin solution is subjected to a precipitation step as described later.

Precipitation Step

Step (a2)

In the step (a2), the PAI resin solution A1 prepared in the dissolution step (a1) is added to a solvent free from surface active agents and able to precipitate fine PAI resin particles to cause the precipitation of fine PAI resin particles. In the step (a2), the PAI resin solution A1 prepared by dissolution under atmospheric pressure conditions (or pressurized conditions) is added to a solvent that can precipitate the PAI resin under atmospheric pressure conditions.

The addition means simply putting the PAI resin solution A1 into a solvent that precipitates the PAI resin, which may be achieved by continuous injection or dripping from a container containing the PAI resin solution into a container containing the solvent that precipitates the PAI resin.

There are no specific limitations on the solvent to be used to precipitate fine PAI resin particles, but it is preferable that the solvent can mix uniformly with the organic solvent used in the dissolution step from the viewpoint of achieving uniform dispersion in the solvent. Uniform mixing means that two or more solvents combined together are mixed uniformly and do not form an interface after being left to stand for one day. In the case of water, for instance, the solvents that mix uniformly with it include NMP, DMF, DMAc, acetone, DMSO, tetrahydrofuran, methanol, and ethanol.

To provide fine PAI resin particles and achieve uniform particle diameters, furthermore, it is preferable that it mixes uniformly with the solvent used in the dissolution step and contains a poor solvent for the PAI resin. The solubility of a PAI resin in a solvent changes depending on temperature, and accordingly, a poor solvent as used herein is one that does not dissolve the PAI resin significantly at the temperature where the PAI resin solution is added, or more specifically, one that can precipitate the PAI resin dissolved in the solution added. Accordingly, an organic solvent may be used as a poor solvent if the solubility of the PAI resin decreases sufficiently at low temperatures, even if the organic solvent is one that can serve to prepare the solution.

For instance, in the case where NMP is adopted as the solvent for the dissolution step, the useful solvents to be used here include NMP, alcohols, acetones, and water, of which an appropriate solvent may be selected for precipitation according to particular purposes. The use of water is particularly preferable because fine PAI resin particles with a uniform particle diameter can be produced easily.

The solvent used to precipitate fine PAI resin particles may be either a single-component solvent or a mixture of two or more solvent components if it is to be mixed uniformly with the organic solvent used in the dissolution step, but it is preferably a mixed solvent containing water because particularly fine particles with a uniform particle diameter can be produced easily.

There are no specific limitations on the usage of the solvent used to precipitate fine PAI resin particles, but it may account, for instance, for 0.3 to 100 parts by mass, preferably 0.4 to 50 parts by mass, and more preferably 0.4 to 10 parts by mass, per 1 part by mass of the solvent used for the dissolution step.

The solvent used in the step (a2) to precipitate fine PAI resin particles is virtually free from surface active agents. If containing a surface active agent, the solvent used to precipitate fine PAI resin particles tends to suffer from bubbling, and the reproducibility will decrease probably because a reduced stability at the time of the addition of solution A. Accordingly, it is most preferable that surface active agents are not contained at all, although they may be contained to some extent as long as they do not impair the effect. Specifically, their content should be about 3 mass % or less, or less than 1 mass % if possible, relative to the quantity of the PAI resin.

When it is added to the solvent used to precipitate fine PAI resin particles, the receiver tank may be either cooled or not. This addition causes fine PAI resin particles to be precipitated from the solution of the PAI resin to form a liquid in which the fine PAI resin particles are dispersed or suspended. When cooling the receiver tank, a refrigerant or ice water is used for cooling. The required cooling temperature for the receiver tank depends on the solvent in the receiver tank used to precipitate fine PAI resin particles, but it is commonly above the solidification temperature of the solvent used to precipitate fine PAI resin particles up to 15° C., and in the case of water, the temperature is preferably 0 to 40° C., more preferably 0 to 30° C., immediately before the addition. In addition, it is preferable that the solvent used to precipitate fine PAI resin particles is stirred.

Step (b2)

The step (b2) is designed for flash crystallization to precipitate the solvent from the PAI resin solution B1 prepared by dissolution in the dissolution step (b1).

In this step for flash crystallization, the solution, while being heated/pressurized or pressurized, is ejected in a jet through a nozzle into another container (which hereinafter may be referred as receiver tank) maintained both at a temperature below the boiling point of the organic solvent used in the dissolution step (or cooled) and at a pressure below that used for the above pressurization (or under reduced pressure) or which is maintained at a pressure below that used for the above pressurization (or under reduced pressure), thereby inducing crystallization of fine particles.

For flash crystallization, the solution is preferably ejected into a solvent. When carrying out flash crystallization in a solvent, the end of the nozzle for squirting solution B may be either immersed in the solvent in the receiver tank or held away from the solvent so that the solution passes through a gas space, of which the former is preferable.

In the production of fine PAI resin particles by flash crystallization from the PAI resin solution B, fine particles with an average primary particle diameter of 300 nm or less, particularly 200 nm or less, can be produced by controlling the PAI resin content below a specific level.

Furthermore, flash crystallization also serves to produce spherical or nearly spherical fine particles because the PAI resin is pushed out at a stroke under a high pressure allowing the solution in the receiver tank to be diffused quickly in the solvent in the receiver tank. Thus, flash crystallization in a solvent is preferred when spherical or nearly spherical fine particles are required.

To explain flash crystallization concretely, it is preferable that a solution of a PAI resin in a container maintained under both heated and pressurized conditions or under pressurized conditions is transferred rapidly into a receiver tank maintained at atmospheric (or reduced) pressure to cause flash crystallization. If, for instance, the resin is heated and dissolved in a pressure container such as autoclave in the dissolution step, the interior of the container is pressurized under the pressure caused by its own heat (it may be further pressurized by supplying inert gas such as nitrogen). This step can be carried out more easily by relieving the pressure from this state to discharge the solution into a receiver tank under atmospheric pressure. If the resin is dissolved at room temperature, the dissolution tank may be pressurized under an appropriate pressure, followed by carrying out flash crystallization in a solvent used to precipitate the PAI resin solution to produce fine PAI resin particles.

For flash crystallization in a solvent, there are no specific limitations on the solvent used to precipitate fine PAI resin particles, and those mentioned for the step (a2) may be used.

There are no specific limitations on the usage of the solvent used to precipitate fine PAI resin particles, but it may account, for instance, for 0.3 to 100 parts by mass, preferably 0.4 to 50 parts by mass, and more preferably 0.4 to 10 parts by mass, per 1 part by mass of the solvent used for the dissolution step.

In carrying out flash crystallization, the solvent used to precipitate fine PAI resin particles may or may not contain a surface active agent, but it is preferable that no surface active agent is contained because otherwise operations to remove the excess surface active agent will be required.

There are no specific limitations on the procedure for flash crystallization, but it is preferable that flash crystallization is carried out in one stage in a container commonly maintained in the range of room temperature to 250° C., preferably room temperature to 100° C. at a pressure equal to or lower than that used for pressurizing the solution or at a reduced pressure, or that flash crystallization is carried out in multiple stages in a container maintained at a pressure lower than that in the tank containing the solution. If, for instance, the resin is heated and dissolved in a pressure container such as autoclave in the dissolution step, the interior of the container is pressurized under the pressure caused by its own heat (it may be further pressurized by supplying inert gas such as nitrogen). This solution in a pressurized state is squirted either into a receiver tank containing the solvent used to precipitate fine PAI resin particles and maintained under atmospheric pressure or into a receiver tank maintained under reduced pressure. In the case where the resin is dissolved without heating it in a pressure container such as autoclave, the solution is pressurized under an appropriate pressure and squirted either into a receiver tank containing the solvent used to precipitate fine PAI resin particles and maintained under atmospheric pressure or into a receiver tank maintained under reduced pressure. It is preferable that the pressure (gauge pressure) applied to the solution for flash crystallization is 0.2 to 4 MPa. For flash crystallization, it is preferably squirted from this environment into an atmospheric pressure environment, more preferably into a receiver tank maintained under atmospheric pressure, to cause flash crystallization.

To carry out flash crystallization in solution B of fine PAI resin particles, the receiver tank may be cooled or may not be cooled. Thus, flash crystallization causes fine PAI resin particles to be precipitated from the solution of the PAI resin to form a liquid in which the fine PAI resin particles are dispersed or suspended. When cooling the receiver tank, a refrigerant or ice water is used for cooling. The required cooling temperature for the receiver tank depends on the solvent in the receiver tank used to precipitate fine PAI resin particles, but it is commonly above the solidification temperature of the solvent used to precipitate fine PAI resin particles up to 15° C., and in the case of water, the temperature should preferably be 0 to 40° C., more preferably 0 to 30° C., immediately before flash crystallization.

To carry out flash crystallization, the outlet of the connecting pipe from the dissolution tank is fixed in the atmosphere space in the receiver tank or immersed in the solvent used to precipitate fine PAI resin particles, of which immersion in the solvent is preferable because finer PAI resin particles can be produced.

The fine PAI resin particles produced in step (b2) can be obtained as a dispersion liquid or a suspension liquid (hereinafter, the dispersion liquid or suspension liquid in this state may be referred as flash crystallization liquid). If the liquid contains coarse grains resulting from an undissolved part of the initial PAI resin material, they can be removed by filtering.

The fine PAI resin particles thus obtained have an average primary particle diameter of 300 nm or less, or more preferably, they are fine particles of 200 nm or less. Its lower limit is about 90 nm. Furthermore, it is possible to obtain fine particles with a uniform particle size, and thus, fine particles of polyamide-imide resin commonly with a coefficient of variation of 70% or less, or preferably 60% or less.

The use of the process allows fine particles with a uniform particle size as described above can be produced stably.

Filtering/Isolation Step

The available methods to isolate fine PAI resin particles include generally known solid-liquid separation techniques such as filtering, centrifugal separation, and centrifugal filtration, but for efficient isolation of very fine PAI resin particles with an average primary particle diameter of 300 nm or less by solid-liquid separation operation, it is preferable that solid-liquid separation operation such as filtering and centrifugal separation is carried out after increasing their particle diameter through coagulation or the like. The available methods for increasing the particle diameter through coagulation include natural coagulation such as causing coagulation naturally over a long period and coagulant-based coagulation such as salting out, but of these coagulation techniques, salting out is preferable because aggregates can be produced in a short period of time and large aggregates can be obtained. The use of a coagulation technique based on salting out makes it possible to produce aggregates with a large particle diameter that are suitable for industrial solid-liquid separation. It is preferable that the aggregates thus produced have an average particle diameter (particle diameter as measure by the method described later) of 5 to 100 µm.

A typical salting out technique to produce aggregates with a large particle diameter is to add about 0.01 to 1,000 parts by mass, preferably 0.05 to 500 parts by mass, of an inorganic salt such as sodium chloride per 1 part by mass of the fine PAI resin particles. Specifically, an inorganic salt may be added directly into the dispersion liquid or suspension liquid, or a 0.1 to 20 mass % solution of the inorganic salt may be added. The useful inorganic salts include sodium chloride, magnesium chloride, calcium chloride, lithium chloride, potassium chloride, sodium acetate, magnesium acetate, calcium acetate, sodium oxalate, magnesium oxalate, calcium oxalate, sodium citrate, magnesium citrate, calcium citrate, and other inorganic salts. The solvent to be used to dissolve these inorganic salts is preferably water. The inorganic salts may be added in advance, or may be dissolved in advance in the solvent used to precipitate fine PAI resin particles in the receiver tank where flash crystallization is to be performed. The solvent used here to precipitate fine PAI resin particles is preferably water. The quantity of inorganic salts to be added is preferably in the range from 0.05 parts by mass per 1 part by mass of the fine PAI resin particles up to the content that saturates the solvent used to precipitate the fine PAI resin particles. Thus, the fine PAI resin particles produced by addition or flash crystallization can be easily isolated by solid-liquid separation after coagulation using such techniques as described above. Even if coagulated by such techniques as described above, the resulting fine PAI resin particles can be re-dispersed very easily.

The available methods for the solid-liquid separation include filtering and centrifugal separation. For the filtering and centrifugal separation, membrane filters (filtering) and filter cloth (filtering, centrifugal separation) may be used. The required aperture of the filter to be used is determined appropriately depending on the particle size of the desired fine PAI resin particles, but it is commonly about 0.1 to 50 µm for membrane filters, or an air permeability of 5 $cm^3/cm^2 \cdot sec$ or less at 124.5 Pa for filter cloth.

The fine PAI particles thus obtained can be applied to various uses as obtained, as a dispersion liquid prepared by dispersing them in an appropriate solvent, or as a composite prepared by re-dispersing them in various other mediums.

EXAMPLES

Measurement of Average Particle Diameter

The average particle diameter of fine PAI resin particles was measured with a laser diffraction/scattering type particle size distribution measuring apparatus, MT3300EXII supplied by Nikkiso Co., Ltd., using 0.5 mass % aqueous solution of polyoxyethylene cumyl phenyl ether (trade name Nonal 912A, supplied by Toho Chemical Industry Co., Ltd., hereinafter referred as Nonal 912A), as a dispersion medium. Specifically, the microtracking technique is used to determine the total volume of the fine particles based on analysis of scattered laser light to prepare a cumulative data curve in which the total volume accounts for 100%, and then the value of particle diameter at 50% in the cumulative data curve (median diameter, d50) is taken as the average particle diameter of the fine particles.

Measurement of Average Primary Particle Diameter

With respect to the average primary particle diameter, 100 particles were randomly selected from a photograph (magnification of 30,000) taken by a scanning electronic microscope, JEOL JMS-6700F supplied by JEOL Ltd., and their diameters (the maximum size across each particle) were measured and averaged to provide the average primary particle diameter.

Calculation of Coefficient of Variation in Average Primary Particle Diameter

With respect to the coefficient of variation (CV) in the average primary particle diameter, 100 particles were randomly selected from photographs (magnification of 30,000) taken by a scanning electronic microscope, JEOL JMS-6700F supplied by JEOL Ltd., and calculations were made using Equations (1) to (3) given below based on the particle size distribution determined from the measured particle diameters.

Mathematical expression 1

(Variance)  Equation (1)

$$\sigma^2 = \frac{1}{N}\sum_{i=1}^{N}(X_i - \overline{X})^2.$$

where X, $\overline{X}$ and N denote the particle diameter, average particle diameter, and number of measurements, respectively.

$\sigma = \sqrt{(\sigma^2)}$  (Standard deviation) Equation (2):

$CV = \sigma/\overline{X}$  (Coefficient of variation) Equation (3):

Measurement of Viscosity

A viscometer, TVB-10M supplied by Toki Sangyo Co., Ltd., was used with a rotor L/Adp at, for instance, a rotor rotating speed of 30 rpm for measuring a viscosity in the range of 10 m to 20 Pa·s and a rotor rotating speed of 6 rpm for measuring a viscosity in the range of 50 to 100 Pa·s. When the viscosity is out of the ranges, an appropriate rotor rotating speed suitable for the viscosity to be measured was selected to determine the viscosity.

Example 1

Dissolution Step (b1)

A stirrer, temperature measuring device, and internal solution extraction tube were attached to the 1,000 ml autoclave dissolution tank. A connecting pipe with a valve for opening and closing it was attached to the extraction tube. A receiver tank for flash crystallization was constructed of a 1,000 ml autoclave equipped with a stirrer, condenser, gas supply pipe, and the other end of the connecting pipe from the dissolution tank (flash crystallization outlet), which were immersed in the liquid in the receiver tank.

To the dissolution tank, 12 g of a PAI resin (TI-5013P, supplied by Toray Industries, Inc., the same powder is used in all Examples given below) and 388 g of NMP (supplied by Kanto Chemical Co., Inc.) were fed (PAI resin accounting for 3 mass %) and the tank was sealed after replacing the atmosphere with nitrogen, followed by heating while stirring to an internal temperature of 240° C. and additional stirring for 1 hour. At this point, the internal pressure (gauge pressure) was 0.15 MPa. Then, the pressure was increased to 0.5 MPa by adding nitrogen gas.

Precipitation Step (b2)

A receiver tank containing 400 g of water was cooled with ice, and supply of a small flow of nitrogen gas was maintained while stirring. The valve on the internal connecting pipe of the dissolution tank was opened to transfer the solution to the receiver tank placed under atmospheric pressure, and stirring was stopped after confirming that the liquid temperature has reached 40° C. or below, followed by opening the receiver tank. The fine PAI resin particles in the flash crystallization liquid in the receiver tank had an average particle diameter of 8.7 μm.

Then, the flash crystallization liquid was added to 400 g of a 4% saline solution, stirred at 1,400 rpm for 30 minutes, and left to stand for 5 hours. The suspension liquid was subjected to salting out, filtering and rinsing to provide wet cakes of fine PAI resin particles. The average primary particle diameter was 109 nm and the coefficient of variation was 32%. Observations by scanning electronic microscopy (SEM) at a magnification of 30,000 showed that the particles were virtually spherical (FIG. 1).

The same operations as above were carried out to check the reproducibility. Results showed that the fine PAI particles had an average primary particle diameter of 102 nm and a coefficient of variation of 28%, thus demonstrating a required reproducibility.

Example 2

Dissolution Step: b1, Precipitation Step: b2

Except that the dissolution tank as used in Example 1 had a temperature 50° C. and was pressurized with nitrogen gas to 0.5 MPa, the same procedure as in Example 1 was carried out. The average particle diameter in the flash crystallization liquid was 12.4 μm. The fine PAI particles had an average primary particle diameter of 110 nm and a coefficient of variation of 40%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 112 nm and a coefficient of variation of 38%, thus demonstrating a desired reproducibility.

Example 3

Dissolution Step: b1, Precipitation Step: b2

Except that the dissolution tank was at normal temperature (21° C.) and pressurized with nitrogen gas to 0.5 MPa, the same procedure as in Example 1 was carried out. The average particle diameter in the flash crystallization liquid was 18.6 μm. The fine PAI particles had an average primary particle diameter of 110 nm and a coefficient of variation of 40%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 110 nm and a coefficient of variation of 39%, thus demonstrating a desired reproducibility.

Example 4

Dissolution Step: b1, Precipitation Step: b2

Except that the dissolution tank was at normal temperature (21° C.) and pressurized with nitrogen gas to 0.5 MPa and that the ratio of the mass of the NMP in the dissolution tank to that of the water in the receiver tank was 1/0.6, the same procedure as in Example 1 was carried out. The average particle diameter in the flash crystallization liquid was 20.2 μm. The fine PAI particles had an average primary particle diameter of 157 nm and a coefficient of variation of 44%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 160 nm and a coefficient of variation of 41%, thus demonstrating a desired reproducibility.

Example 5

Dissolution Step: b1, Precipitation Step: b2

Except that the dissolution tank was at normal temperature (21° C.) and pressurized with nitrogen gas to 0.5 MPa and that the ratio of the mass of the NMP in the dissolution tank to that of the water in the receiver tank was 1/0.4, the same procedure as in Example 1 was carried out. The average particle diameter in the flash crystallization liquid was 22.4 μm. The fine PAI particles had an average primary particle diameter of 155 nm and a coefficient of variation of 51%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 153 nm and a coefficient of variation of 48%, thus demonstrating a desired reproducibility.

Example 6

Dissolution Step: B1, Precipitation Step: B2

Except that the dissolution tank was at normal temperature (21° C.) and pressurized with nitrogen gas to 0.5 MPa and that 14 g of PAI and 386 g of NMP were fed to the dissolution tank (PAI resin accounting for 3.5 mass %), the same procedure as in Example 1 was carried out. The average particle diameter in the flash crystallization liquid was 19.6 μm. The fine PAI particles had an average primary particle diameter of 167 nm and a coefficient of variation of 46%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 160 nm and a coefficient of variation of 47%, thus demonstrating a desired reproducibility.

Example 7

Dissolution Step: B1, Precipitation Step: B2

Except that the dissolution tank was at normal temperature (21° C.) and pressurized with nitrogen gas to 0.5 MPa and that 16 g of PAI and 384 g of NMP were fed to the dissolution tank (PAI resin accounting for 4 mass %), the same procedure as in Example 1 was carried out. The average particle diameter in the flash crystallization liquid was 19.2 μm. The fine PAI particles had an average primary particle diameter of 175 nm and a coefficient of variation of 62%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 170 nm and a coefficient of variation of 60%, thus demonstrating a desired reproducibility.

Example 8

Dissolution Step: B1, Precipitation Step: B2

Except that the dissolution tank was at normal temperature (21° C.) and pressurized with nitrogen gas to 0.5 MPa and that 20 g of PAI and 380 g of NMP were fed to the dissolution tank (PAI resin accounting for 5 mass %), the same procedure as in Example 1 was carried out. The average particle diameter in the flash crystallization liquid was 24.5 μm. The fine PAI particles had an average primary particle diameter of 249 nm and a coefficient of variation of 52%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 252 nm and a coefficient of variation of 55%, thus demonstrating a desired reproducibility.

Example 9

Dissolution Step: b1, Precipitation Step: b2

Except that the dissolution tank was at normal temperature (21° C.) and pressurized with nitrogen gas to 1 MPa, the same procedure as in Example 1 was carried out. The average particle diameter in the flash crystallization liquid was 17.2 μm. The fine PAI particles had an average primary particle diameter of 143 nm and a coefficient of variation of 58%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 140 nm and a coefficient of variation of 55%, thus demonstrating a desired reproducibility.

Example 10

Dissolution Step: b1, Precipitation Step: b2

Except that the dissolution tank as used in Example 1 was at normal temperature (21° C.) and pressurized with nitrogen gas to 0.25 MPa, the same procedure as in Example 1 was carried out. The average particle diameter in the flash crystallization liquid was 20.2 μm. The fine PAI particles had an average primary particle diameter of 161 nm and a coefficient of variation of 43%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 160 nm and a coefficient of variation of 45%, thus demonstrating a desired reproducibility.

Example 11

Dissolution Step: b1, Precipitation Step: b2

Except that the dissolution tank as used in Example 1 was at normal temperature (21° C.) and pressurized with nitrogen gas to 0.5 MPa and that the solvent in the dissolution tank was DMF, the same procedure as in Example 1 was carried out. The average particle diameter in the flash crystallization liquid was 16.3 μm. The fine PAI particles had an average primary particle diameter of 91 nm and a coefficient of variation of 46%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 95 nm and a coefficient of variation of 43%, thus demonstrating a desired reproducibility.

Example 12

Dissolution Step: b1, Precipitation Step: b2

Except that the dissolution tank as used in Example 1 was at normal temperature (21° C.) and pressurized with nitrogen gas to 0.5 MPa and that the solvent in the dissolution tank was DMAc, the same procedure as in Example 1 was carried out. The average particle diameter in the flash crystallization liquid was 21.6 μm. The fine PAI particles had an average primary particle diameter of 130 nm and a coefficient of variation of 39%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 125 nm and a coefficient of variation of 38%, thus demonstrating a desired reproducibility.

Example 13

Dissolution Step: b1, Precipitation Step: b2

Except that the dissolution tank as used in Example 1 was at normal temperature (21° C.) and pressurized with nitrogen gas to 0.5 MPa and that the solvent in the dissolution tank was DMSO, the same procedure as in Example 1 was carried out. The average particle diameter in the flash crystallization liquid was 23.1 μm. The fine PAI particles had an average primary particle diameter of 163 nm and a coefficient of variation of 48%. Observations by scanning electronic microscopy (SEM) at a magnification of 30,000 showed that the particles were virtually spherical.

The same operations as above were carried out to check reproducibility. Results showed that the fine PAI particles had an average primary particle diameter of 158 nm and a coefficient of variation of 50%, thus demonstrating a desired reproducibility.

Example 14

Dissolution Step: a1, Precipitation Step: a2

Figure 2:
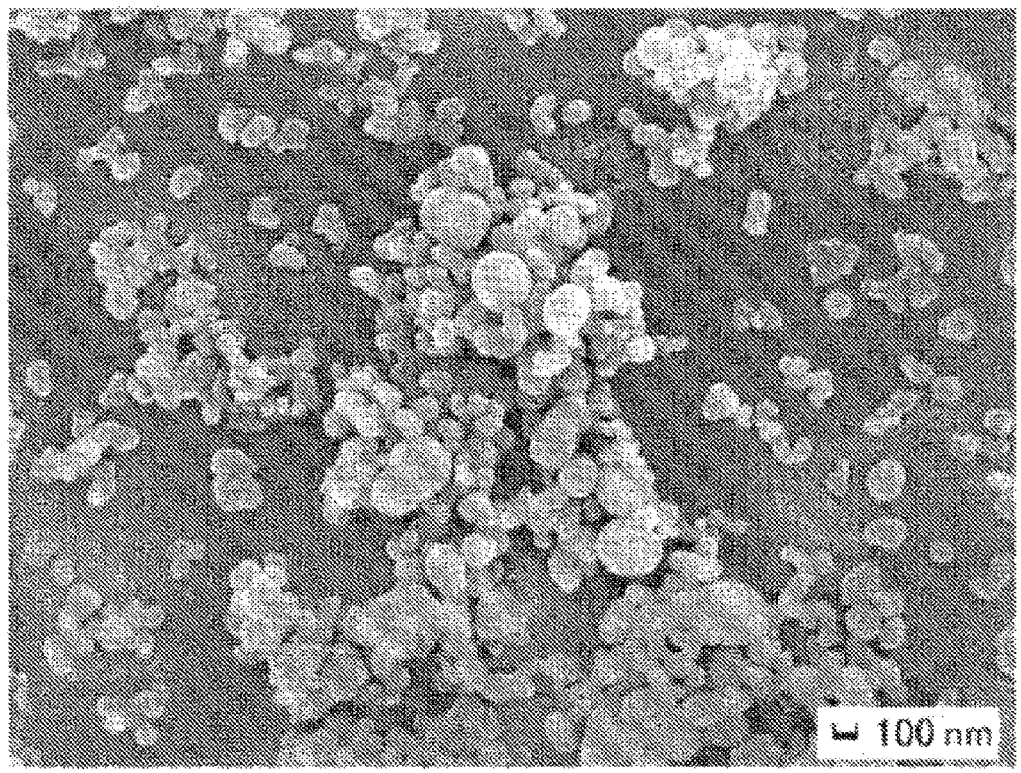
FIG. 2 is a scanning electronic microscope photograph of the fine PAI particles produced in Example 14.

First, 1.5 g of a PAI resin was dissolved in 48.5 g of NMP (PAI resin accounting for 3 mass %), and then the resulting solution was dripped from a pipette to 50 g of stirred water at room temperature (21° C.) to produce a suspension liquid of fine PAI resin particles. The average diameter of the particles in the suspension liquid was 17.6 μm. The suspension liquid was added to 50 g of a 4% saline solution, stirred at 1,400 rpm for 30 minutes, and left to stand for 3 hours. The suspension liquid was subjected to salting out, filtering and rinsing to provide wet cakes of fine PAI resin particles. The fine PAI particles had an average primary particle diameter of 140 nm and a coefficient of variation of 36%. Observations by scanning electronic microscopy (SEM) at a magnification of 30,000 showed that part of the particles appeared to have been fused into cocoon-like bodies (FIG. 2).

The same operations as above were carried out to check reproducibility. Results showed that the fine PAI particles had an average primary particle diameter of 139 nm and a coefficient of variation of 39%, thus demonstrating a desired reproducibility.

Example 15

Dissolution Step: a1, Precipitation Step: a2

Except that 1.75 g of the PAI resin and 48.25 g of NMP (PAI resin accounting for 3.5 mass %) were fed, the same procedure as in Example 14 was carried out. The average diameter of the particles in the suspension liquid was 21.7 μm. The fine PAI particles had an average primary particle diameter of 159 nm and a coefficient of variation of 58%. Observations by scanning electronic microscopy (SEM) at a magnification of 30,000 showed that part of the particles appeared to have been fused into cocoon-like bodies.

The same operations as above were carried out to check reproducibility. Results showed that the fine PAI particles had an average primary particle diameter of 163 nm and a coefficient of variation of 57%, thus demonstrating a desired reproducibility.

Example 16

Dissolution Step: a1, Precipitation Step: a2

Except that 2 g of the PAI resin and 48 g of NMP (PAI resin accounting for 4 mass %) were fed, the same procedure as in Example 14 was carried out. The average diameter of the particles in the suspension liquid was 20.4 μm. The fine PAI particles had an average primary particle diameter of 183 nm and a coefficient of variation of 48%. Observations by scanning electronic microscopy (SEM) at a magnification of 30,000 showed that part of the particles appeared to have been fused into cocoon-like bodies.

The same operations as above were carried out to check reproducibility. Results showed that the fine PAI particles had an average primary particle diameter of 177 nm and a coefficient of variation of 48%, thus demonstrating a desired reproducibility.

Comparative Example 1

Dissolution Step: a1, Precipitation Step: a2

Figure 3:
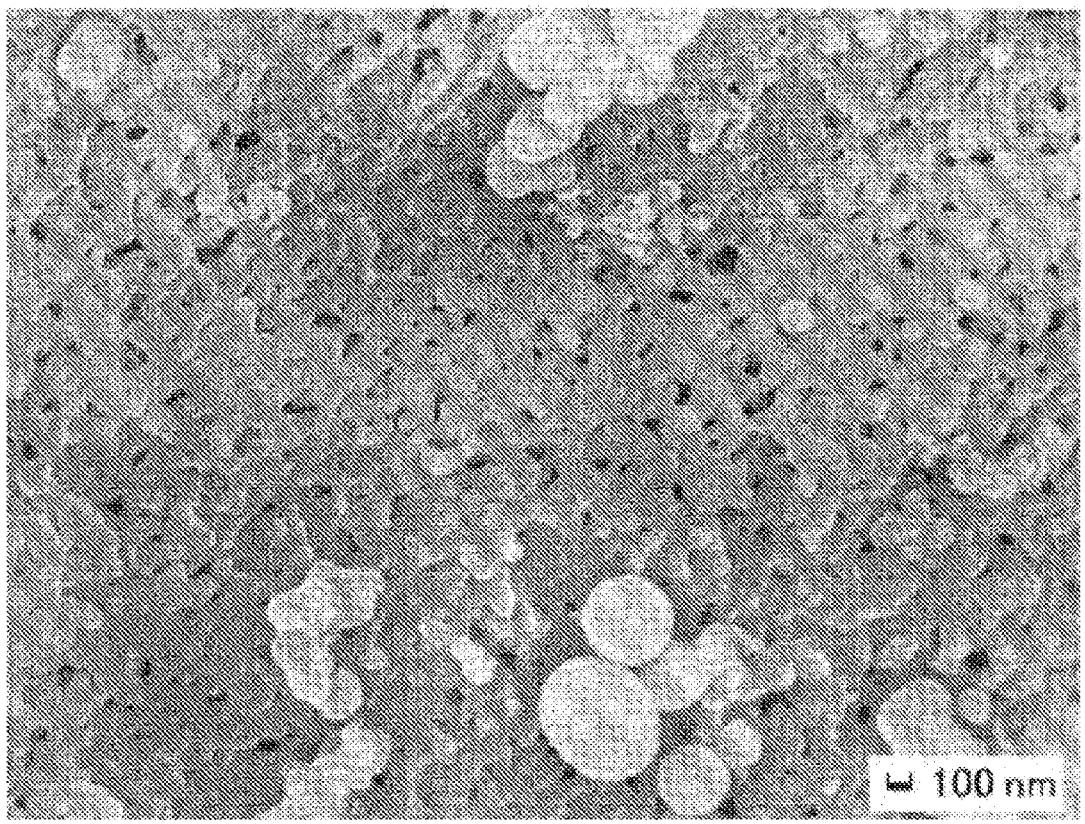
FIG. 3 is a scanning electronic microscope photograph of the fine PAI particles produced in Comparative example 1.

Except that 2.5 g of the PAI resin and 47.5 g of NMP (PAI resin accounting for 5 mass %) were fed, the same procedure as in Example 14 was carried out. Nonspherical coarse particles were formed (FIG. 3).

Comparative Example 2

Dissolution Step: B1, Precipitation Step: B2

Except that the dissolution tank as used in Example 1 was at normal temperature (21° C.) and pressurized with nitrogen gas to 0.5 MPa and that the ratio of the mass of the NMP in the dissolution tank to that of the water in the receiver tank was 1/0.2, the same procedure as in Example 1 was carried out. Nonspherical coarse particles were formed.

Comparative Example 3

Dissolution Step: b1, Precipitation Step: b2

Except that the dissolution tank as used in Example 1 was at normal temperature (21° C.) and pressurized with nitrogen gas to 0.5 MPa and that 40 g of PAI and 360 g of NMP were fed to the dissolution tank (PAI resin accounting for 10 mass %), the same procedure as in Example 1 was carried out. Large massive bodies were formed.

The invention claimed is:
1. A process of producing fine particles of polyamide-imide resin comprising:
   a dissolution step (b1) and a precipitation step (b2)
   wherein
   (b1) polyamide-imide resin is dissolved in an organic solvent to prepare a polyamide-imide resin solution B1 having a polyamide-imide resin content of not less than 3 mass % and less than 10 mass %, and
   (b2) the polyamide-imide resin solution B1 is subjected to flash crystallization with a solvent that is virtually free from surface active agents and able to precipitate fine particles of the polyamide-imide resin to cause precipitation of fine particles of the polyamide-imide resin,
   such that the fine particles have an average primary particles diameter of 300 nm or less,
   wherein the solvent used to precipitate the polyamide-imide resin particles of step (b2) accounts for 0.3 to 100 parts by mass per 1 part by mass of the solvent used to prepare the polyamide-imide resin solution in step (b1).

2. The process as claimed in claim 1, wherein the solution is pressurized at 0.2 to 4 MPa (gauge pressure) and subjected to flash crystallization in said precipitation step (b2).

3. The process as claimed in claim 1, wherein the organic solvent used in said dissolution step is at least one selected from the group consisting of N-methyl-2-pyrrolidinone, dimethyl formamide, dimethyl acetamide, dimethyl sulfoxide, and 1,3-dimethyl-2-imidazolidinone.

4. The process as claimed in claim 1, wherein the solvent used to precipitate fine particles of the polyamide-imide resin in said precipitation step (b2) is water.

5. The process as claimed in claim 2, wherein the organic solvent used in said dissolution step is at least one selected from the group consisting of N-methyl-2-pyrrolidinone, dimethyl formamide, dimethyl acetamide, dimethyl sulfoxide, and 1,3-dimethyl-2-imidazolidinone.

6. The process as claimed in claim 2, wherein the solvent used to precipitate fine particles of the polyamide-imide resin in said precipitation step (b2) is water.

7. The process as claimed in claim 3, wherein the solvent used to precipitate fine particles of the polyamide-imide resin in said precipitation step (b2) is water.

* * * * *